Patented Mar. 9, 1943

2,313,093

UNITED STATES PATENT OFFICE 2,313,093

DIELECTRIC FOR ELECTROSTATIC CONDENSERS

Samuel Ruben, New Rochelle, N. Y.

No Drawing. Application February 11, 1939, Serial No. 255,819

1 Claim. (Cl. 260—80)

This invention relates to electrostatic condensers.

The general object of the invention is the provision of a new type of electrostatic condenser having high voltage break down and insulation resistance, having a capacitance per unit area comparing favorably with electrostatic condensers now available and possessing a low power factor.

A specific object is the provision of an electrostatic condenser of the closely spaced wound foil type employing a solid organic dielectric, capable of operation on alternating current.

A further object is the provision of an electrostatic condenser employing a solid organic dielectric which is superior to electrostatic condensers employing a liquid dielectric.

Another object is the provision of an electrostatic condenser employing a dielectric which is solid and non-flowing at normal temperatures but which has a low viscosity at high temperatures and which may be readily impregnated into porous spacers or conveniently cast into desired shape.

Still another object is the provision of an electrostatic condenser employing a solid dielectric which also acts as a moisture proof seal.

Another object is the provision of an electrostatic condenser employing a dielectric which provides all the advantages of oil but which is solid and non-flowing at operating temperatures, which allows the construction of electrostatic condensers in cardboard or other non-metallic containers and which eliminates the necessity of expensive sealing means required in the use of oil or other fluid dielectrics.

The prior art has avoided the use of solid dielectrics in condensers for continuous alternating current operation because of two general limitations: (1) Increase in power factor with temperature, which condition became progressively worse due to low heat conductivity and lack of circulation; (2) Carbonization and disintegration at armature junctions due to dynamic effect of electrical field and tendency to localized ionization.

Where synthetic compounds have been used, for example, halogenated naphthalene or cellulose ester films, I have observed that disassociation occurs with electrolytic effects, such as the splitting off of an acid radical or a halogen gas. These defects or characteristics produce a rise in power factor loss of the condenser with localized destructive effects and ultimate break down. Such effects are accelerated by high temperatures.

The problem of alternating current operation with present day wound foil electrostatic condensers is made more difficult by the close spacing of the electrodes. In general, liquid dielectrics, such as mineral oil or chlorinated di-phenyl mixtures have been used because of their mobility which allows better heat conductivity and continuous contact with electrodes. These materials are capable of withstanding the alternating high tension fields because of their mobility but have definite limitations especially in relation to the maximum temperature at which they can continue operation and the maximum potentials which can be applied for a given thickness of dielectric or for a given spacing between the foils. I have observed that at high temperatures these liquid dielectrics release ionizable material which due to the mobile state of the liquid dielectric is readily discharged through the porous spacer between the close spaced electrodes and both electrolytic and cataphoric conduction take place coincident with progressive destruction. A costly factor in the use of liquid dielectrics is the expensive necessity of providing liquid tight sealed containers. The cost of sealing an oil filled condenser and especially of preventing leaks at the terminals is often times as great as the cost of the condenser section. Nevertheless, large quantities of oil filled condensers are used because up to now no satisfactory solid organic dielectric condensers, capable of alternating current operation at commercial voltages or high temperatures, has been available.

I have found that certain hydrogenated hydrocarbon resins, specifically the brittle hydrogenated naphthalene base resins such as the polymer of di-hydronaphthalene when combined with a plasticizing dielectric medium to produce a solid non-brittle adhesive composition capable of being bonded to the electrodes, have the property of decreasing in power factor with temperature, thereby duplicating electrically in an improved manner, the low power factor of liquids at elevated temperatures.

The solid hydrogenated naphthalene is stable, has a high melting point, is liquifiable at high temperatures below the destruction temperature of cellulose spacers and when cooled reverts to its original physical condition; it has a power factor lower than 0.5% when impregnated in paper spacers and is water repellent. In addition, it possesses the ability to combine with another dielectric which is fluid or which is liquifiable at temperatures below the destruction point of the porous spacer, which is also water repellent and which serves as a plasticizer. The combination of the two dielectrics produces a stable material of high specific resistance which is solid but slightly plastic, which is permanently thermoplastic, which tenaciously adheres to the electrodes, which is liquifiable and of low viscosity at temperatures below the destruction point of the porous spacer and at a low enough temperature, for instance, at least in the neighborhood of 130° C. to 150° C., to permit its ready and thorough impregnation into a tightly wound condenser unit employing a cellulose spacer, and the material is sufficiently stable and immobile at all operating temperatures to prevent electrolytic or cataphoric migration of impurities between the foils; it possesses the property of acting as an effective water proof seal for the condenser unit. Adhesion or bonding of the dielectric to the electrodes is an important factor in obtaining long operating life under normal and abnormal alternating current operation. It possesses a low or limited positive coefficient of power factor loss at the highest required operating temperature.

The addition of hydrogen to the conjugated ring structure of naphthalene ($C_{10}H_8$) to produce the di-hydronaphthalene ($C_{10}H_{10}$) and subsequent polymerization to the solid stage ($C_{40}H_{40}$) provides the best resin for the purpose of this invention. The molecular structure of this resin accounts for its electrical and chemical stability. By itself, solid hydrogenated naphthalene possesses certain limitations which preclude to a great extent its application in that form as a dielectric for electrostatic condensers. It is very brittle, cracks on cooling and condensers made with it show a low voltage break down with destructive electrical field effects due to its rigidity. When combined and plasticized in the manner hereinafter described, however, a solid organic material is produced which is more satisfactory for use on continuous alternating current than any other solid organic dielectric material, which I have tested.

In preparing a dielectric utilizing the solid hydrogenated naphthalene resin 2% to 30% dimer of di-hydronaphthalene is employed as an added plasticizing dielectric. It is of advantage to add 1% naphthalene to the oil in order to reduce the viscosity and facilitate impregnation of the condenser by the combined dielectrics.

The composition may be prepared by heating the solid hydrogenated naphthalene to 140° C. and when completely liquid the added liquid dielectric is introduced and the mixture continuously stirred until a clear solution is obtained. If naphthalene is to be added it is put in at this stage and stirred with the mixture which is then allowed to cool. In its finished form this material is a clear fluorescent colored composition with a slight amber tint.

The composition of the invention may be used in the form of a dielectric impregnant for foil-paper wound condenser structures, the impregnation preferably being carried out at a temperature of about 150° C., at which point the mixtures are fluid and thin. The dielectric may also be produced by casting the material either alone or in combination with other dielectrics in suspension such as crystalline $TiO_2$, mica, etc. The dielectric may be employed in the manufacture of condensers by other methods known to the art, for instance, by directly coating foil electrodes with the dielectric composition without the use of an additional intervening spacer or by impregnating a porous spacer such as paper with the dielectric, thereafter winding the impregnated paper spacers with the electrode foils and subsequently heating the rolled unit to cause the impregnated paper to adhere to the foils and to provide a moisture proof seal around the unit. Also, the dielectric may be used in connection with other devices, such as coils, etc., where its characteristics make it a suitable impregnant or filler.

What is claimed is:

In an electric condenser, a solid dielectric comprising mixed solid and liquid polymers of dihydronaphthalene.

SAMUEL RUBEN.